United States Patent
Yang

(10) Patent No.: US 10,853,363 B2
(45) Date of Patent: Dec. 1, 2020

(54) DATA STORAGE APPARATUS, TRANSLATION APPARATUS, AND DATABASE ACCESS METHOD

(71) Applicant: Alibaba Group Holding Limited, George Town (KY)

(72) Inventor: Zhifeng Yang, Hangzhou (CN)

(73) Assignee: Alibaba Group Holding Limited, Grand Cayman (KY)

(*) Notice: Subject to any disclaimer, the term of this patent is extended or adjusted under 35 U.S.C. 154(b) by 0 days.

(21) Appl. No.: 16/779,531

(22) Filed: Jan. 31, 2020

(65) Prior Publication Data

US 2020/0250190 A1    Aug. 6, 2020

(30) Foreign Application Priority Data

Feb. 2, 2019    (CN) .......................... 2019 1 0107394

(51) Int. Cl.
  *G06F 16/24*    (2019.01)
  *G06F 16/2453*    (2019.01)
  (Continued)

(52) U.S. Cl.
  CPC .... *G06F 16/24534* (2019.01); *G06F 16/1734* (2019.01); *G06F 16/221* (2019.01); *G06F 16/244* (2019.01); *G06F 16/284* (2019.01)

(58) Field of Classification Search
  CPC .................................................. G06F 16/258
  (Continued)

(56) References Cited

U.S. PATENT DOCUMENTS 10,176,153 B1 *   1/2019   Sack ..................... G06F 40/174
10,552,443 B1 *   2/2020   Wu ...................... G06F 16/2237
(Continued)

FOREIGN PATENT DOCUMENTS

| CN | 103744952 | 4/2014 |
|----|-----------|--------|
| CN | 106326309 | 1/2017 |
| TW | 201530328 | 8/2015 |

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Baoquoc N To
(74) *Attorney, Agent, or Firm* — Fish & Richardson P.C.

(57) ABSTRACT

Methods, systems, and apparatus, including computer programs encoded on a computer storage medium, for accessing a relational database using requests that conform to a non-structure query language syntax. In one aspect, a method includes receiving, from a client, a first access request that conforms to a NoSQL syntax for accessing a wide column store, wherein the first access request comprises a first event feature and a first attribute feature that are related to the wide column store, and the first attribute feature comprises a column family feature of the wide column store; translating the first access request into a second access request that conforms to a SQL syntax, wherein the second access request comprises a second event feature corresponding to the first event feature and a second attribute feature corresponding to the first attribute feature; and forwarding the second access request to a relational database.

20 Claims, 7 Drawing Sheets

Wide table: hbase_101

| ID | CF 1 | | CF 2 | |
|----|------|--------|---------|------|
|    | name | gender | Chinese | Math |
| 1  | Tom  | man    | 80      | 81   |
| 2  | June | girl   | 90      | 95   |

(51) Int. Cl.
  *G06F 16/22* (2019.01)
  *G06F 16/17* (2019.01)
  *G06F 16/242* (2019.01)
  *G06F 16/28* (2019.01)

(58) Field of Classification Search
  USPC .................................................. 707/809, 811
  See application file for complete search history.

(56) References Cited

U.S. PATENT DOCUMENTS

| | | | | |
|---|---|---|---|---|
| 2015/0142751 A1* | 5/2015 | Bruce | ..................... | G06F 16/25 707/662 |
| 2015/0293764 A1* | 10/2015 | Visvanathan | ............. | G06F 8/36 717/102 |
| 2017/0169061 A1 | 6/2017 | Cao et al. | | |
| 2018/0267969 A1 | 9/2018 | Shoolman et al. | | |
| 2018/0349463 A1* | 12/2018 | Bernhardy | .......... | G06F 16/2365 |

OTHER PUBLICATIONS

Nakamoto "Bitcoin: A Peer-to-Peer Electronic Cash System," www.bitcoin.org, 2005, 9 pages.

Chasseur et al., wisc.edu [online], "Enabling JSON Document Stores in Relational Systems," Jun. 2013, retrieved on Apr. 28, 2020, retrieved from URL<http://pages.cs.wisc.edu/~chasseur/pubs/argo-long.pdf>, 16 pages.

HBase: the Definitive Guide, 1st ed., O'Reilly Media, Inc., Sep. 23, 2011, Chapter 1, Chapter 3, and Chapter 8, 157 pages.

PCT International Search Report and Written Opinion in International Application No. PCT/US2020/015872, dated Apr. 28, 2020, 20 pages.

* cited by examiner

Wide table: hbase_100

| ID | CF 1 | |
|---|---|---|
| | name | gender |
| 1 | Tom | Man |
| 2 | June | Girl |

FIG. 2A

Table: hbase_100&CF1

| ID | CF 1 | Value |
|---|---|---|
| 1 | name | Tom |
| 1 | gender | man |
| 2 | name | June |
| 2 | gender | girl |

FIG. 2B

Wide table: hbase_101

| ID | CF1 | | CF2 | |
|---|---|---|---|---|
| | name | gender | Chinese | Math |
| 1 | Tom | man | 80 | 81 |
| 2 | June | girl | 90 | 95 |

FIG. 3A

Table: hbase_100&CF2

| ID | CF 2 | Value |
|---|---|---|
| 1 | Chinese | 80 |
| 1 | Math | 81 |
| 2 | Chinese | 90 |
| 2 | Math | 95 |

FIG. 3B

DATA STORAGE APPARATUS, TRANSLATION APPARATUS, AND DATABASE ACCESS METHOD

CROSS-REFERENCE TO RELATED APPLICATIONS

This application claims priority to Chinese Patent Application No. 201910107394.3, filed on Feb. 2, 2019, which is hereby incorporated by reference in its entirety.

TECHNICAL FIELD

The present disclosure relates to the database field, and in particular, to a relational database enabling non-relational access.

BACKGROUND

Currently, relational databases are fully developed and widely used in various industries including finance due to advantages of atomicity, consistency, isolation, and durability (ACID). However, because a conventional relational database has a bottleneck in performance and scale when dealing with requirements such as storage, query, and analysis of big data, various non-relational databases (NoSQL databases) emerge as a new force in the field of data storage and analysis. Data storage in the non-relational database needs no fixed table structure, and therefore storage structures can be flexible. In addition, a table mode may not need to be predefined, thereby facilitating rapid prototype verification and agile development.

SUMMARY

If both a relational database and a non-relational database are deployed for the same client or the same application, not only costs are increased due to the relational database, but also challenges are brought to technology and data security during synchronous maintenance of the two types of databases. The present disclosure expects to provide a relational database supporting both relational SQL access and non-relational NoSQL access, and the relational database stores data of a non-relational database type by using a relational data table. Therefore, the relational database not only has better scalability than a conventional database, but also enables a NoSQL application to have financial-level data security and a high-availability service brought by the relational database.

According to an aspect of the present disclosure, a data storage apparatus is provided, including a relational database, configured to store a relational data table of a relationship table model corresponding to a non-relational data model, where the non-relational data model conforms to a non-structured query language (NoSQL) specification, and a translation module, configured to translate a first access request that conforms to the non-structured query language (NoSQL) specification into a second access request that conforms to an access specification of the relationship table model, to access the relational data table.

According to an aspect of the present disclosure, a method for accessing a relational database is provided. The relational database can store a relational data table of a relationship table model corresponding to a non-relational data model, and the non-relational data model conforms to a non-structured query language (NoSQL) specification. The method includes: receiving a first access request from a client that conforms to the non-structured query language (NoSQL) specification. translating the first access request into a second access request that conforms to an access specification of the relationship table model, to access the relational data table. and forwarding the second access request to the relational database.

According to an aspect of the present disclosure, a translation apparatus enabling access to a relational database access is provided. The relational database is configured to store a relational data table of a relationship table model corresponding to a wide column store model. The translation apparatus includes a first interface, configured to receive a first access request that conforms to a non-structured query language (NoSQL) specification, where the first access request includes a first event feature and a first attribute feature that are related to a wide column store, and the first attribute feature includes a column family feature of the wide column store, a parsing module, configured to parse the first access request to generate a second access request that conforms to an access specification of the relationship table model, where the second access request includes a second event feature corresponding to the first event feature and a second attribute feature corresponding to the first attribute feature, and the second attribute feature includes: a column family field corresponding to a column family of the wide column store and used to store a name of each column field in the column family of the wide column store, and a value field used to store a field value of each column field in the column family of the wide column store, and a second interface, configured to forward the second access request to the relational database, to access the relational data table.

In addition, according to an implementation of the present disclosure, a computer readable medium having an instruction is further provided, and when the instruction is executed by one or more computing systems, the computing system performs the method according to an implementation of the present disclosure.

In addition, according to an implementation of the present disclosure, a computing device is further provided, including: a memory storing code and a processor configured to execute the code to implement the method according to an implementation of the present disclosure.

In the solutions of the present disclosure, based on a mature relational data table, only a server, namely, a translation module or an interface, used for wide column store access needs to be provided, and the relational database can be converted into a wide column store database with reference to a client. When the conversion is implemented in the same system, the relational database in the present disclosure is equivalent to a multi-model database supporting both a relationship model and a wide column store model.

BRIEF DESCRIPTION OF DRAWINGS

FIGS. 2A and 2B are schematic diagrams illustrating an example wide column store and an example relational data table, according to an implementation of the present disclosure;

FIGS. 3A and 3B are schematic diagrams illustrating another example wide column store and another example relational data table, according to an implementation of the present disclosure;

DESCRIPTION OF IMPLEMENTATIONS

The implementations of the present disclosure described below in detail with reference to the accompanying drawings are examples and are intended to explain the present disclosure, but should not be construed as a limitation on the present disclosure.

Figure 1:
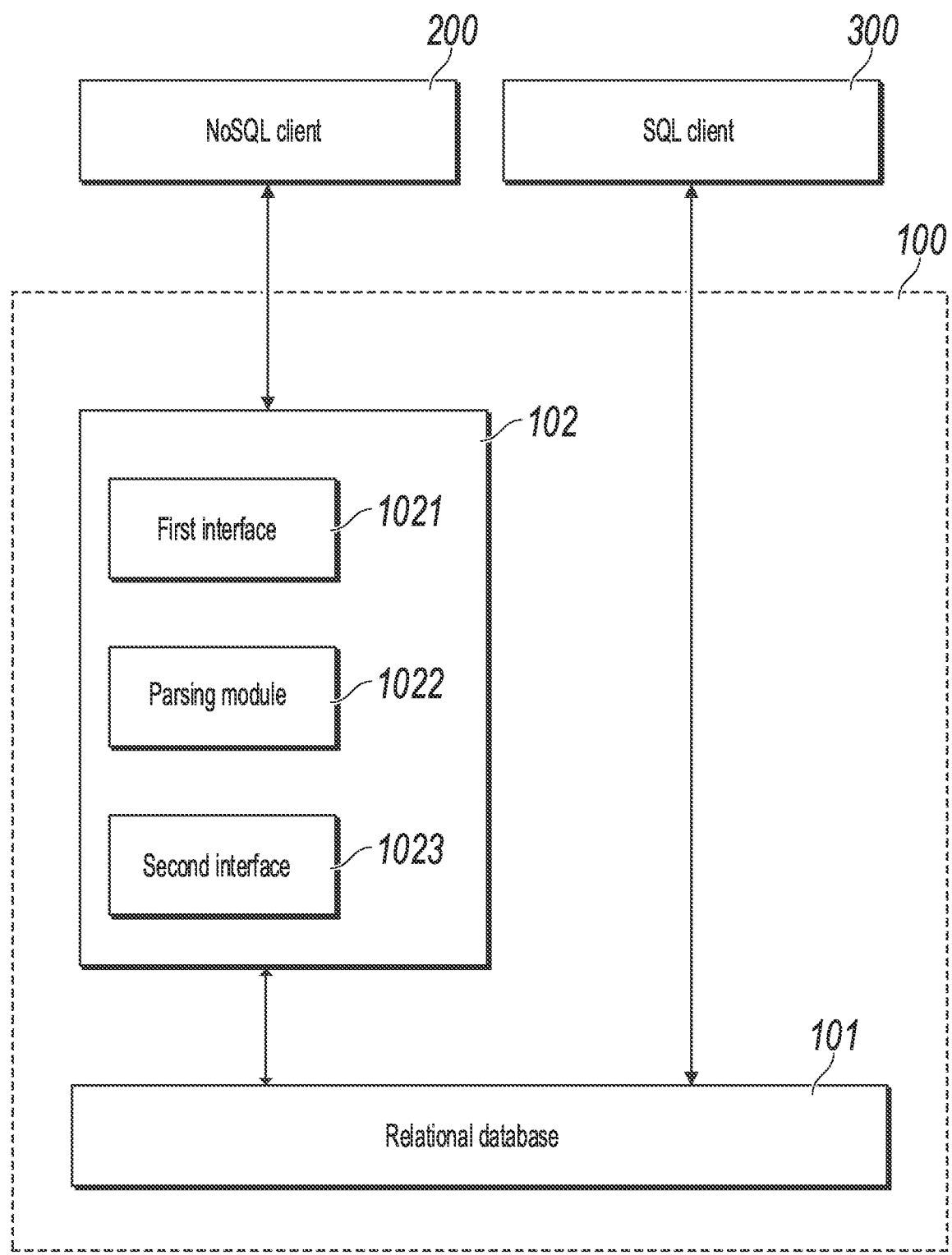
FIG. 1 is a schematic diagram illustrating a storage apparatus 100 enabling access of a non-relational database type.

FIG. 1 is a schematic diagram illustrating a storage apparatus 100 enabling access of a non-relational database type. As shown in the figure, the storage apparatus 100 includes a relational database 101 and a translation module 102. The relational database 101 can maintain a relational data table of a relationship table model corresponding to a non-relational data model. The relational database 101 can be any type of database currently known, such as oracle, sysbase, or MySQL, and supports relational data model storage. Currently, the relational database usually supports two types of access specifications for a relational data model. One is accessing the relational data model by using a standard SQL (structured query language) specification, and the one is providing an underlying function, namely, an application programming interface (API), to directly access the underlying relational data table. A non-relational data model, such as a wide column store model widely supported in data bases such as Hbase, bigtable, Cassandra, or another existing product, is used as a NoSQL database module. Columns and attributes do not need to be predefined for the wide column store model, and each row in the same table is allowed to have different columns. Therefore, the wide column store model has characteristics different from the relational data model. A specification used to access the non-relational data model is different from that used to access the relational data model, and the specification is referred to here as a non-structured query language specification. In the present disclosure, a NoSQL standard language and an application programming interface (API) supported by the existing NoSQL database model is collectively referred to as the non-structured query language specification.

The relational database 101 can use the translation module 102 to support an access operation on a wide column store database from a NoSQL client 200, to store data of a non-relational database type in the relational database 101 and access data of a non-relational database type in the relational database 101. In addition, the relational database 101 also allows another SQL client 300 that uses an access specification of the relationship table model to directly access a data table in the relational database 101, including accessing the relational data table by using an SQL standard language or directly accessing the relational data table by calling an API function.

To enable the relational database 101 to support an access operation on a wide column store database, an API or a standard SQL language library that conforms to the relational data model is provided in the translation module 102, to access the relational data table in the relational database 101. An application programming interface (API) library or a NoSQL language library that conforms to a plurality of non-structured query language specifications is further provided, to interpret a received access request or command that conforms to the non-structured query language specification. Then the translation module 102 can translate the access request into an access request that conforms to the access specification of relationship table model. The wide column store model is used as an example of the non-relational data model in the following description.

To support a client application using the non-structured query language specification in the relational database, for a wide column store storage structure in a form of a column family in a non-relational database, a relational data table corresponding to the wide column store storage structure is provided in the relational database 101 to support access in a form of a Non-SQL. FIG. 2A and FIG. 2B show a diagram of mapping between a wide column store and a relational data table.

FIG. 2A shows a structure of an example wide column store hbase_100. As shown in the figure, the wide column store includes a primary key field ID used to store a sequence number of a primary key (rowkey) in the wide column store. The wide column store further includes a column family CF1. The column family CF1 has a plurality of column fields: name (name) and gender (gender). There are two wide column store records in the example wide column store. Field values of name (name) and gender (gender) fields are respectively "Tom" and "man" (man) for the 001 record, and field values of name (name) and gender (gender) fields are respectively "June" and "girl" (female) for the 002 record.

To store the wide column store data shown in FIG. 2A in the relational database, as shown in FIG. 2B, a relational data table hbase_100&CF1 is defined as a storage model for the column family in the wide column store. The relational data table hbase_100&CF1 includes a field ID used to store the rowkey of the wide column store, where the rowkey is a sequence number in this example, and a column family field CF1, where the column family field stores all column field names in the column family by using a plurality of records. As shown in FIG. 2A, the column family CF1 has two column fields: name and gender. Therefore, two records are created for the same rowkey in the relational data table hbase_100&CF1, and respectively store column field contents "name" and "gender". The relational data table hbase_100&CF1 further includes a value field 'Value', and the value filed is used to store corresponding values of 'name' and 'gender' in each column field in the wide column store. Therefore, the wide column store data is stored by using the relational data table. The relational database is transparent to a user, and the relational database is converted into a "virtual" wide column store database.

With reference to the structure of the storage apparatus 100 that stores the relational database shown in FIG. 1, how to convert an operation performed by a client on the "virtual" wide column store database by using a NoSQL language specification into an operation on the relational database is described below.

As described above, the wide column store translation module 102 is disposed for the relational database 101, so that the relational database 101 can support the client in accessing a virtual wide column store by using a NoSQL language, and the wide column store data is physically stored in the relational data table. Access to the wide column store includes creation, modification, deletion, etc. of the wide column store.

As shown in FIG. 1, the translation module 102 includes a first interface 1021, a parsing module 1022, and a second interface 1023. The first interface 1021 receives a wide column store access request NoSQL_Access from a NoSQL client. The wide column store access request includes an event feature NEventID and an attribute feature NAttField that conform to the non-structured query language (NoSQL) specification. The event feature NEventID here defines an expected operation event for a wide column store, for example, whether to create a wide column store, or delete, modify, or query data. The attribute feature NAttField defines a field object corresponding to the event feature NEventID, and includes a column family feature of the wide column store.

After receiving the wide column store access request NoSQL_Access from the first interface 1021, the parsing module 1022 parses the wide column store access request NoSQL_Access based on a client library (for example, a language library that conforms to Hbase, bigtable, Cassandra database standards) of a plurality of programming languages stored inside the parsing module 1022 to generate a relationship table access request Relation_Access used to access the relational database 101. The access request Relation_Access includes an event feature EventID used to access the relational database and an attribute feature AttField corresponding to the wide column store attribute feature NAttField. The event feature EventID here defines an expected operation event for the relational data table, for example, whether to create, delete, modify, or query data. The attribute feature AttField defines a field object related to the event feature EventID, and includes: a column family field corresponding to the column family of the wide column store and used to store a name of each column field in the column family of the wide column store, and a value field used to store a field value of each column field in the column family of the wide column store.

The second interface 1023 forwards the access request Relation_Access generated by the parsing module 1022 to the relational database 101, to implement an operation on the relational data table.

Operations of the translation module 102 are still described below by using events such as creation of the wide column store and record addition shown in FIG. 2A as an example. An example in which the client uses an HBase database language specification and accesses the relational database by using a standard SQL language is used for description.

Creation of the Wide Column Store

When a user wants to create the wide column store shown in FIG. 2A to store data, the user can send a wide column store access request NoSQL_Access for creating a wide column store. For example, the access request has a NoSQL standard language in the following format:
  create 'hbase_100', {ID=>'CF1'}

The translation module 102 stores a client library supporting a NoSQL access specification. Therefore, after receiving the wide column store access request NoSQL_Access through the first interface 1021, the translation module 102 parses the NoSQL_Access request based on the NoSQL specification, to determine an event feature included in the wide column store access request, that is, table creation "create". An attribute feature of the access request includes the following: a wide column store name is 'hbase_100', a name of a rowkey (rowkey) field in the wide column store is 'ID', and a name of a column family in the wide column store is 'CF1'.

Therefore, to create the relational data table in the relational database 101 to store data in the wide column store 'hbase_100', the parsing module 1022 generates, based on a standard SQL language specification, a relationship table access request Relation_Access for creating a relationship table in the relational database. In this example, Relation_Access is represented by SQL_Access. In an example, the relationship table access request SQL_Access is shown below:
  create table hbase_100$CF1 (
  ID varbinary(1024),
  CF1 varbinary(256),
  Value varbinary(1048576) NOT NULL,
  primary key(ID, CF1))

The ID column stores the rowkey of the table 'hbase_100'.

The CF1 is used to store a name of each column field (column qualifier) in the column family "CF1"

The value column stores a field value corresponding to each column field (column qualifier).

In addition, to implement exclusive access to the relationship table 'hbase_100', (ID, CF1) is specified as a primary index key in the created relationship table. As such, data in several columns of each row in the wide column store shown in FIG. 2B is stored in several adjacent rows in the relationship table shown in FIG. 2A, and each row stores one unit of the wide column store. The hbase_100 created here is transparent to the user, that is, the user 'views' the virtual wide column store shown in FIG. 2A.

In an example of the present disclosure, a mapping relationship between the wide column store 'hbase_100' that the client wants to create and the relational database 'hbase_100$CF1' created in the relational database 101 can be stored separately in a meta information table in the relational database 101 as meta information. Optionally, the translation module 102 can determine the corresponding relational data table 'hbase_100$CF1' based on a predetermined naming rule and the wide column store name 'hbase_100' included in the wide column store request.

In a wide column store database, a record in each row usually has a time dimension field used to store timestamp information of data in each row. The time dimension feature can also be transferred to the relational data table. For example, the relational database 101 can create the relational data table based on the following access request SQL_Access generated by the translation module 102.
  create table hbase_100$CF1 (
  ID varbinary(1024),
  CF1 varbinary(256),
  T bigint,
  Value varbinary(1048576) NOT NULL,
    primary key(ID, CF1, T))

The T column stores a timestamp version 'timestamp', and the timestamp is usually a millisecond after a time point (for example, Jan. 1, 1970 UTC).

Record Addition

When the user wants to add a record to the wide column store hbase_100, for example, the record relates to a roster of a class, a 'name' field and a 'gender' field can be added to the column family CF1, to register all students in the class. Therefore, the user can send two NoSQL standard language access requests in the following forms:
  put 'hbase_100', '001','CF1:name','Tom'
  put 'hbase_100', '001','CF1:gender','man'

The two access requests are operations on the same record '001' in the wide column store.

After receiving a NoSQL request for adding a name column: put'hbase_100', '001','CF1:name','Tom', the parsing module 1022 can determine that in the request, the event feature 'put' is a record addition operation, and a related attribute feature is the column field 'name' added to the column family. In addition, the NoSQL request further includes a value feature, and in this example, the value feature is a field value 'tom' corresponding to the column field 'name'. After parsing the request, the parsing module 1022 generates an access request SQL_Access used to access the relational data table, to add a record to the data table. In an example, the SQL_Access request is: insert into hbase_100$CF1values ('001','name','tom').

An event feature included in the access request SQL_Access is translated into 'insert' that conforms to the SQL language specification, and values are separately assigned to fields 'ID', 'CF1', and 'Value' in a sequence of the fields in the created relationship table, to create a new record. To be specific, the assignment sequence represents each field in the relationship table, that is, an attribute feature. In addition, the access request SQL_Access further includes a value feature. In addition to the value features '001' and 'Tom' in the access request NoSQL_Access, the parsing module 1022 further forms a new value feature 'name' by using the attribute feature 'name' in NoSQL_Access, and the new value feature is used as an assigned field value and the CF1 field in the relational data table hbase_100$CF1.

Similarly, for a received request for adding a gender column: put 'hbase_100','001','CF1:gender','man', the parsing module 1022 can determine that in the request, the event feature 'put' is a record addition operation, and a related attribute feature is that the column field 'gender' is added to the column family, and a corresponding field value is 'man'. After parsing the request, the parsing module 1022 generates an access request SQL_Access used to access the relational data table, to add another record to the data table. In an example, the SQL_Access request is: insert into hbase_100$CF1values('001',gender,'man').

In the previous implementation, an example that the translation module 102 translates the NoSQL access request into the access request SQL_Access that conforms to the standard SQL language is used for description. As described above, the relational database 101 not only supports access to the relational data table by using the standard SQL language through an SQL layer, but also provides an underlying API interface function to directly access the relational data table. Therefore, in another implementation of the present disclosure, after receiving the NoSQL access request from the client, the translation module 102 can translate the NoSQL access request, namely, NoSQL_Access, into Relation_Access in an API function call request form supported by the relational database 101. In this example, API_Access is used to represent Relation_Access, to access the relational data table without using the SQL layer. For example, in the previous example, when a wide column store access request in a form of a NoSQL standard language command: put 'hbase_100', '001','CF1:name','Tom', to add wide column store data, after the access request is parsed by the translation module 102, the following API_Access for the relationship table model is generated:

Table table=new Table("hbase_100$CF1", connection);
TableOperation op=new TableOperation( );
op.put("K", "001", "Q", "name", "V", "Tom");
table.execute(op);

The translation module 102 sends API_Access of the above function call form to the relational database 101 through the second interface 1023. The relational database 101 implements a direct operation on the relational data table "hbase_100$CF1" by executing "hbase_100$CF1".

In addition, in the previous implementation, the NoSQL access request, namely, NoSQL_Access, is described in the form of the NoSQL standard language command. As described above, the non-structured query language specification further includes an API supported by a NoSQL database. The translation module 102 in the present disclosure can also parse an access request that is in a form of the API supported by the NoSQL database and that is sent by the client, and convert the access request into an access request that conforms to the access specification, namely, the SQL standard language or the API, supported by the relational database. Addition of wide column store data in the previous example is still used as an example, in addition to the standard NoSQL language command: put 'hbase_100', '001','CF1:name','Tom', the client can also choose to send an access request NoSQL_Access in a wide column store API call format:

HTable htable=new HTable("hbase_100", connection);
Put put=new Put("001");
put.add("CF1", "name", "Tom");
htable.put(put);

After receiving the access request NoSQL_Access in the wide column store function API call format, the translation module 102 can choose to translate the access request NoSQL_Access into a request SQL_Access that conforms to the SQL standard language specification: insert into hbase_100$CF1values ('001','name','tom').

As in the example request NoSQL_Access can also be translated into an access request API_Access in an API function call format supported by the relational database:

Table table=new Table("hbase_100$CF1", connection);
TableOperation op=new TableOperation( );
op.put("K", "001", "Q", "name", "V", "Tom");
table.execute(op).

It is worthwhile to note that when the translation module 102 receives NoSQL_Access from the client, whether the translation module 102 translates NoSQL_Access into an access request in the SQL standard language or in the function API call form depends on a specific operation or event to be performed by current NoSQL_Access. For example, the translation module 102 can translate the NoSQL_Access request for creating a wide column store into SQL_Access in a form of the standard SQL language, and translate another wide column store operation request into the API_Access request. Optionally, the translation module 102 can translate all NoSQL_Access from the client into API_Access or SQL_Access. For ease of description, SQL_Access is still used as an example in the following description.

The previous implementation is specific to a case that the wide column store includes only one column family. When the wide column store includes two or more column families, a separate relationship table is created for each column family. FIG. 3A shows an example of a wide column store hbase_101 having two column families, and a column family CF2 of student score is added based on hbase_100. After receiving, through the first interface 1021, a request NoSQL_Access for creating the wide column store shown in FIG. 3A from the client, the translation module 102 parses the request. For example, the Hbase database language is still used as an example, and the NoSQL_Access request is: create 'hbase_101', {ID=>'CF1'}, {ID=>'CF2'}.

The parsing module 1022 can determine, from the NoSQL_Access request, that this request is a wide column store creation event and obtains an attribute feature, including a wide column store name 'hbase_101' and a rowkey name 'ID'. The wide column store has two column families with column family names 'CF1' and 'CF2'. Based on these features, the parsing module creates two SQL_Access requests that conform to the SQL language specification, and the first SQL_Access request is to create an hbase_101$CF1 table:

create table hbase_101$CF1 (
    ID varbinary(1024),
    CF1 varbinary(256),
    Value varbinary(1048576) NOT NULL,
        primary key(ID, CF1)).

Same as the relationship table created with reference to the wide column store in FIG. 2A, the relational data table hbase_101$CF1 created in the relational database 101 based on the first SQL_Access request is still the table shown in FIG. 2B.

The second SQL_Access request is to create hbase_101$CF2, and is described below:

create table hbase_101$CF2 (
    ID varbinary(1024),
    CF2 varbinary(256),
    Value varbinary(1048576) NOT NULL,
        primary key(ID, CF2))

The relational data table hbase_101$CF2 created in the relational database 101 based on the second SQL_Access request is shown in FIG. 3B. As described above, an association among the wide column store hbase_101 and each of the relational data tables hbase_101$CF1 and hbase_101$CF2 is stored in the relational database 101 as meta information for access by the translation module 102.

As such, two relational data tables hbase_101$CF1 and hbase_101$CF2 are created in the relational database 101, to store data in the to-be-created wide column store hbase_101. The translation module 102 can selectively convert an operation of the client on the wide column store hbase_101 into an operation on one or both of the relationship tables hbase_101$CF1 and hbase_101$CF2. Generally, when data is added to the wide column store or data in the wide column store is modified, the operation is performed column by column. Therefore, an operation from the client on each row and each column of the wide column store is converted into an operation on one or more rows in the same rowkey of one of the relational data tables.

For example, for a wide column store query operation frequently used in a database, the translation module 102 can convert response data provided by the relational data table from a relational data table type to a wide column store mode and provide the response data to the client. Therefore, the created relationship table is transparent to the user, and the user can see virtual 'wide column store' query output. Data query in the wide column store hbase_101 in the previous example is used as an example for description.

After the user creates the wide column store 'hbase_101', when the user wants to obtain student information whose sequence number is '001', the user can send the following NoSQL_Access request: get 'hbase_101','001'.

After the translation module 102 receives the request through the first interface 1021, the parsing module 1022 determines that an event of the request is a query (get), and an attribute feature included in the request includes a table name 'hbase_101' and a rowkey field ID (ID=001). Therefore, the translation module 102 can determine, based on previously stored meta information (or based on a predetermined command rule), that the wide column store 'hbase_101' stores two relational data tables in the database 101: 'hbase_101CF1' and 'hbase_101CF1'. Therefore, the parsing module translates the NoSQL_Access request into an SQL_Access request used to query the data tables hbase_101CF1 and hbase_101CF2. For example, in the standard SQL language, the request can be:

select * from hbase_101$CF1 where ID=001
select * from hbase_101$CF2 where ID=001.

As shown in the example, the SQL_Access request conforms to the SQL language format, and the event feature has been translated into 'select'. A specified new attribute feature is relationship tables named hbase_101$CF1 and hbase_101$CF2, and is queried based on the rowkey field ID.

After obtaining the two requests, in response to the select command, the relational database 101 separately finds name and gender information and language and math score information in the same ID=001, and outputs these query results as responses to the SQL_Access request.

After the second interface 1023 receives the response results from the relational database 101 that respond to the query request, the parsing module 1022 organizes the two query results based on the same ID value, namely, a rowkey of the wide column store. Query result that conforms to a wide column store form is generated based on the name of the relationship table (hbase_101$CF2 or hbase_101$CF1) that sends the query results, and attribute features CF1 and CF2, and value features gender, name, Chinese, math, man, Tom, 80, and 81 that are included in the query results. The query results are sent to the client through the first interface 1021 as response to the NoSQL query request, to display the query results on the client of the user in the wide column store form:

| get'hbase_110','001' | |
|---|---|
| COLUMN | CELL |
| CF1:gender | value=man |
| CF1:name | value=Tom |
| CF2:chinese | value=80 |
| CF2:math | value=81 |

It is worthwhile to note that the display result shown here is merely used for description, but other display information is ignored.

In one or more implementations of the present disclosure, wide column store data is stored by using the relational data table, and therefore advantages of the relational database can be embodied in wide column store application. For example, advantages of the wide column store lie in that data can be quickly queried and accessed, data analysis is convenient, and all information of the user can be viewed by using one record. However, the wide column store is weaker than the relational database in terms of data management. In the present disclosure, the wide column store data is stored by using the relational database, and the following processing can be performed on the stored data by using a principle of the relational database.

I. Partition Method is Selected Based on Service Requirement.

(1) Key Partition

If a full-range scan event rarely occurs in a user service, or only a query event 'get' is needed, in an implementation, key partition can be used in the created relationship table, so that data is evenly distributed and data skew and hotspots do not occur. For example, the following partition can be performed on a created relationship table Ttable1$Family1:

create table Ttable1$Family1 (
    K varbinary(1024),
    Q varbinary(256),
    T bigint,
    V varbinary(1048576) NOT NULL,
        primary key(K, Q, T))
    partition by key(K) partitions 97;

The +K column stores the rowkey of the table Ttable1$Family1.

+Q corresponds to a column family name 'family1' in the wide column store 1, and is used to store content or a name of each column field (column qualifier) in the column family 'family1' based on a column.

+T represents a time dimension, and is used to store a timestamp version 'timestamp' based on a column, and the timestamp is usually a millisecond after a time point (usually Jan. 1, 1970 UTC).

The +V column stores a value 'value' corresponding to each column field (column qualifier).

K, Q, and T form a union primary key of the relationship table, and are exclusive in the relationship table. The T field is in an inverse order (if the T field is arranged in ascending order in the relationship table, the T field is stored as a negative number). As such, an operation of reading the latest data can be improved (the latest data needs to be arranged in the front).

(2) Key Partition Through Virtual Column Combination

If 'Scan' needs to be used in a service, but a scan range is always a fixed-length prefix (prefix scan) of a rowkey, a virtual column can be defined on K, and then key partition is performed on the virtual column. In this method, it can be ensured that only one partition is related in each scan. Unless prefix data is skewed, this partitioning method also helps avoid hotspots. An example is shown below:

create table Ttable1$Family1(
        K varbinary(1024),
        Q varbinary(256),
        T bigint,
        V varbinary(1048576),
        K_PREFIX varbinary(1024) generated always as (substring(K, 1, 4)),
        primary key(K, Q, T))
    ) partition by key(K_PREFIX) partitions 97;

The function substring (K, 1, 4) indicates that the first four bytes of K (namely, the rowkey in the wide column store) is used as a substring, and "4" here is merely an example, and can be replaced with a corresponding prefix length based on a service rowkey feature.

(3) Range Partition

If a service needs both 'prefix scan' and 'get', range partition needs to be created. If the underlying relational database does not support automatic range management, rowkey distribution needs to be estimated or sampled in advance, to select a division point for range partition. If the estimation is not illogical, this partitioning method is prone to cause data skew and hotspots, and this method should be avoided. An example is shown below:

create table Table1$Family1(
        K varbinary(1024),
        Q varbinary(256),
        T bigint,
        V varbinary(1048576),
        K_PREFIX varbinary(1024) generated always as (substring(K, 1, 4)),
        primary key(K, Q, T))
    ) partition by range columns (K)
        (PARTITION p0 VALUES LESS THAN ('a'),
        PARTITION p1 VALUES LESS THAN ('w'),
        PARTITION p2 VALUES LESS THAN MAXVALUE).

It is worthwhile to note that column names and column types such as K, Q, T, and V of the relationship table are specified to help describe the solutions. Actually, any similar column names and column types (for example, the varbinary type can be any string type, and the bigint type can be any type that can be used to express version data) can be used. There may be another partition method for the table, and the primary key can define another sorting method. These changes should be considered as a solution same to this solution, and the solution should be protected.

II. Multi-Column Family Support

In a Non_SQL database, some wide column store systems support a multi-column family (column family). Different columns of the same row are divided, and data that belongs to the same column family is aggregated when being stored at a bottom layer, so that I/O overheads during data reading is improved in some cases. To further improve performance, overheads of distributed transactions need to be reduced. When a relational data table is created for a wide column store, a plurality of column family of the same wide column store can be aggregated on the same server to avoid multi-machine transactions. For example, assuming that a wide column store 'Table 1' has two column families: family1 and family2, it is defined as follows:

create tablegroup tg1;
    create table Table1$Family1 (
        K varbinary(1024),
        Q varbinary(256),
        T bigint,
        VXLAN varbinary(1048576) NOT NULL,
        primary key(K, Q, T)) tablegroup='tg1';
    create table Table1$Family2 (
        K varbinary(1024),
        Q varbinary(256),
        T bigint,
        V varbinary(1048576) NOT NULL,
        primary key(K, Q, T)) tablegroup='tg1'.

In the previous implementation, the translation module 102 is integrated with the relational database 101 in an interface form of the relational database 101. However, in another implementation of the present disclosure, the translation module 102 can be located on a client or in a cloud. For example, the user stores and accesses wide column store data in a remote relational database by accessing the cloud. Therefore, the translation module 102 can exist as a separate middleware or a part of a database.

It is not difficult to understand that the relational data table created for the wide column store model here conforms to a standard relational data specification. Therefore, the relational database 101 supports the client of the relational database in directly querying and accessing the database. Therefore, in the storage apparatus in this implementation of the present disclosure, harmonious coexistence of the NoSQL and the SQL is implemented by alternatively operating the same piece of data by using the NoSQL and the SQL.

Figure 4:
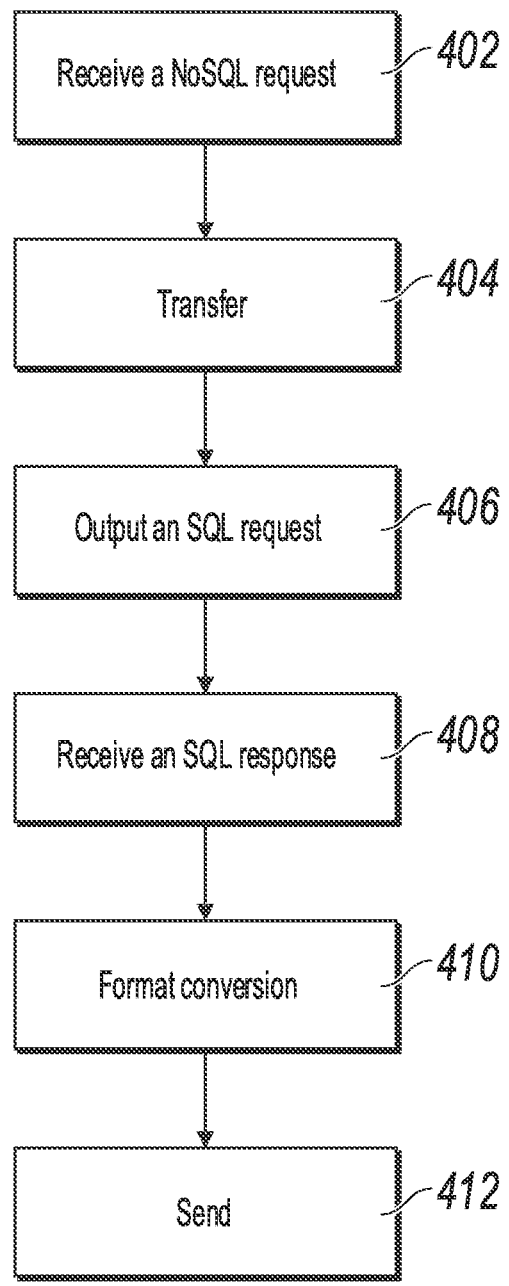
FIG. 4 is a flowchart illustrating a data access method, according to an implementation of the present disclosure.

FIG. 4 is a flowchart illustrating a method for accessing a relational database, according to an implementation of the present disclosure. The relational database can store a relational data table of a relationship table model corresponding to a non-relational data model, and the non-relational data model conforms to a non-structured query language (NoSQL) specification.

As shown in the figure, in step 402, a NoSQL access request that conforms to the non-structured query language (NoSQL) specification is received from a client. In step 404, the NoSQL access request is translated into an access request Relation_Access that conforms to an access specification supported by the relational database, to access the relational data table. In an implementation of the present disclosure, when the non-relational data model is a wide column store model, the NoSQL access request includes a first event feature and a first attribute feature that are related to a wide column store, and the first attribute feature includes a column family feature of the wide column store. In this case, after the NoSQL access request is received in step 404, the NoSQL access request is first parsed to generate the access request Relation_Access. The access request Relation_Access includes a second event feature corresponding to the first event feature and a second attribute feature corresponding to the first attribute feature. The second attribute feature includes: a column family field corresponding to a column family of the wide column store and used to store a name of each column field in the column family of the wide column store, and a data value field used to store a field value of each column field in the column family of the wide column store. In addition, when the first attribute feature further includes other fields of the wide column store model, these other fields and policies thereof are also copied into the SQL access request.

After the access request Relation_Access is generated, the access request Relation_Access is forwarded to the relational database in step 406, to implement an operation on the relational database based on a requested event feature.

If the NoSQL request sent by the client needs a response result, the response result for execution of the Relation_Access request is received from the relational database in step 408, and then a format conversion is performed on the returned response result based on the wide column store mode in step 410. The conversion includes converting display of results in rows in the relational database to display of the results in columns in the wide column store. When responses are received from a plurality of relationship tables, different response results are combined and a combined response result is converted into the wide column store mode. Then the combined result is sent to the client in step 412.

Figure 5:
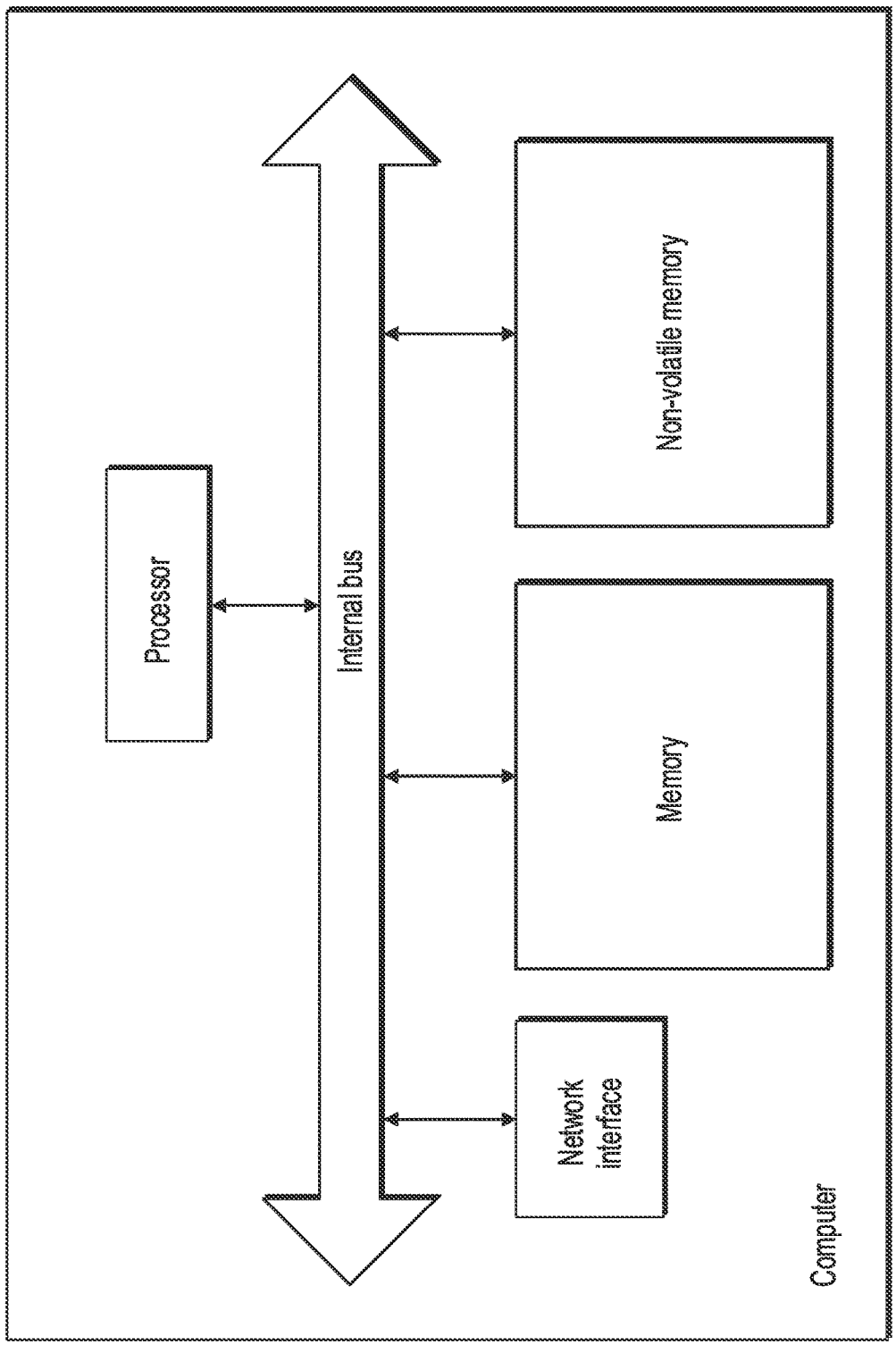
FIG. 5 is a schematic diagram illustrating a computing device, according to an implementation of the present disclosure.

It is worthwhile to note here that though the present disclosure is described with reference to the previous example implementations, but apparently, the present disclosure is not limited thereto. A person skilled in the art further realizes that various illustrative logical blocks, modules, and method steps described with reference to content disclosed in the present specification can be implemented as electronic hardware, computer software, or combination thereof. Software implementation is used as an example. As a logical device, the device is formed by reading a corresponding computer program instruction in a non-volatile memory to a memory by a processor. In terms of hardware, as shown in FIG. 5, in an implementation, the translation module in the present disclosure can be implemented by one or more computing device. For example, the computing device is a client device. It is worthwhile to note that in addition to a processor, a memory, a network interface, and a non-volatile memory shown in FIG. 5, the computing device for implementing a translation function in this implementation usually can further include other hardware based on an actual function of the computing device. Details are omitted.

A machine readable medium provided in another implementation of the present disclosure stores a machine readable instruction. When the machine readable instruction is executed by a computer, the computer performs any one of the methods disclosed in the specification. In this case, program code read from the machine readable medium can implement a function of any one of the implementations. Therefore, the machine readable code and the machine readable medium that stores the machine readable code form a part of the present disclosure.

It is worthwhile to note that not all steps or modules are necessary in the procedures and the structural diagrams of the device, and some steps or modules need to be ignored according to an actual need. An execution sequence of the steps are not fixed and can be adjusted according to a need. The system structure described in the previous implementations can be a physical structure or a logical structure. To be specific, some modules can be implemented by the same physical entity, or some modules can be implemented by a plurality of physical entities or implemented by some components in a plurality of independent devices.

The present disclosure is displayed and described in detail by using the accompanying drawings and some implementations. However, the present disclosure is not limited to the disclosed implementations. Persons skilled in the art realize that based on the plurality of implementations, more implementations of the present disclosure can be obtained by combining code reviewing methods in different implementations. These implementations also fall within the protection scope of the present disclosure.

What is claimed is:

1. A method, comprising:
receiving, from a client, a first access request that conforms to a non-structured query language (NoSQL) syntax for accessing a wide column store, wherein the first access request comprises one or more first event features and one or more first attribute features that are related to the wide column store, and the one or more first attribute features comprise features of a first column family and features of a second column family of the wide column store;
translating the first access request into a second access request that conforms to a structured query language (SQL) syntax, wherein the second access request comprises one or more second event features corresponding to the one or more first event features and one or more second attribute features corresponding to the one or more first attribute features, and the one or more second attribute features comprise:
one or more column family fields corresponding to one or more column families of the wide column store, each of the one or more column family fields used to store a name of a corresponding column field in a corresponding column family of the wide column store, and
one or more data value fields each used to store one or more field values of a corresponding column field in a corresponding column family of the wide column store;
forwarding the second access request to a relational database;
receiving, from the relational database, a response to the second access request;
translating the response into a response to the first access request; and
sending the translated response to the client.

2. The method according to claim 1, wherein
translating the first access request into the second access request comprises parsing the first access request based on a library supporting one or more programming languages.

3. The method according to claim 1, wherein the first access request further comprises one or more first value features, and each of the one or more first value features comprises a field value of a corresponding column field in a corresponding column family of the wide column store.

4. The method according to claim 1, wherein the one or more first attribute features comprise one or more rowkey features and one or more time dimension features of the wide column store, and the one or more second attribute features comprise one or more rowkey fields used to store one or more rowkeys of the wide column store and one or more time fields used to store one or more time dimension values of the wide column store; and the relational database uses the one or more rowkey fields, the one or more column family fields, and the one or more time fields as a composite primary index key.

5. The method according to claim 1, wherein translating the first access request into the second access request further comprises: generating at least two second access requests respectively corresponding to the first column family and the second column family based on the first access request; and forwarding the at least two second access requests to the relational database, to access a first relationship table and a second relationship table corresponding to the first column family and the second column family.

6. The method according to claim 1, wherein the one or more first event features comprise creation, modification, or reading of a record in each row of the wide column store; and the one or more second event features comprise creation of a relational data table or modification or reading of records in a plurality of rows corresponding to a plurality of column fields.

7. The method according to claim 6, further comprising: partitioning the relational data table based on the one or more rowkey fields.

8. The method according to claim 6, further comprising: partitioning the relational data table based on a prefix of a rowkey of the one or more rowkeys.

9. The method according to claim 6, further comprising: partitioning the relational data table based on a division point determined by estimating distribution of a rowkey of the one or more rowkeys.

10. The method according to claim 5, wherein the first relationship table and the second relationship table are aggregated on a storage apparatus in association with each other.

11. A non-transitory, computer-readable medium storing one or more instructions executable by a computer system to perform operations comprising:

receiving, from a client, a first access request that conforms to a non-structured query language (NoSQL) syntax for accessing a wide column store, wherein the first access request comprises one or more first event features and one or more first attribute features that are related to the wide column store, and the one or more first attribute features comprise features of a first column family and features of a second column family of the wide column store;

translating the first access request into a second access request that conforms to a structured query language (SQL) syntax, wherein the second access request comprises one or more second event features corresponding to the one or more first event features and one or more second attribute features corresponding to the one or more first attribute features, and the one or more second attribute features comprise:

one or more column family fields corresponding to one or more column families of the wide column store, each of the one or more column family fields used to store a name of a corresponding column field in a corresponding column family of the wide column store, and one or more data value fields each used to store one or more field values of a corresponding column field in a corresponding column family of the wide column store;

forwarding the second access request to a relational database;

receiving, from the relational database, a response to the second access request;

translating the response into a response to the first access request; and sending the translated response to the client.

12. The non-transitory, computer-readable medium according to claim 11, wherein translating the first access request into the second access request comprises parsing the first access request based on a library supporting one or more programming languages.

13. The non-transitory, computer-readable medium according to claim 11, wherein the first access request further comprises one or more first value features, and each of the one or more first value features comprises a field value of a corresponding column field in a corresponding column family of the wide column store.

14. The non-transitory, computer-readable medium according to claim 11, wherein the one or more first attribute features comprise one or more rowkey features and one or more time dimension features of the wide column store, and the one or more second attribute features comprise one or more rowkey fields used to store one or more rowkeys of the wide column store and one or more time fields used to store one or more time dimension values of the wide column store; and the relational database uses the one or more rowkey fields, the one or more column family fields, and the one or more time fields as a composite primary index key.

15. The non-transitory, computer-readable medium according to claim 11, wherein translating the first access request into the second access request further comprises: generating at least two second access requests respectively corresponding to the first column family and the second column family based on the first access request; and forwarding the at least two second access requests to the relational database, to access a first relationship table and a second relationship table corresponding to the first column family and the second column family.

16. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving, from a client, a first access request that conforms to a non-structured query language (NoSQL) syntax for accessing a wide column store, wherein the first access request comprises one or more first event features and one or more first attribute features that are related to the wide column store, and the one or more first attribute features comprise features of a first column family and features of a second column family feature of the wide column store;

translating the first access request into a second access request that conforms to a structured query language (SQL) syntax, wherein the second access request comprises one or more second event features corresponding to the one or more first event features and one or more second attribute features corresponding to the one or more first attribute features, and the one or more second attribute features comprise:

one or more column family fields corresponding to one or more column families of the wide column store, each of the one or more column family fields used to store a name of a corresponding column field in a corresponding column family of the wide column store, and one or more data value fields each used to store one or more field values of a corresponding column field in a corresponding column family of the wide column store;

forwarding the second access request to a relational database;

receiving, from the relational database, a response to the second access request;

translating the response into a response to the first access request; and sending the translated response to the client.

17. The computer-implemented system according to claim 16, wherein
translating the first access request into the second access request comprises parsing the first access request based on a library supporting one or more programming languages.

18. The computer-implemented system according to claim 16, wherein the first access request further comprises one or more first value features, and each of the one or more first value features comprises a field value of a corresponding column field in a corresponding column family of the wide column store.

19. The computer-implemented system according to claim 16, wherein the one or more first attribute features comprise one or more rowkey features and one or more time dimension features of the wide column store, and the one or more second attribute features comprise one or more rowkey fields used to store one or more rowkeys of the wide column store and one or more time fields used to store one or more time dimension values of the wide column store; and the relational database uses the one or more rowkey fields, the one or more column family fields, and the one or more time fields as a composite primary index key.

20. The computer-implemented system according to claim 16, wherein
translating the first access request into the second access request further comprises: generating at least two second access requests respectively corresponding to the first column family and the second column family based on the first access request; and forwarding the at least two second access requests to the relational database, to access a first relationship table and a second relationship table corresponding to the first column family and the second column family.

* * * * *